United States Patent
Knorr et al.

(10) Patent No.: US 7,020,984 B2
(45) Date of Patent: Apr. 4, 2006

(54) DEVICE FOR FEEDING A DRYING GAS TO A MIXING GRANULATOR

(75) Inventors: Wolfgang Knorr, Dresden (DE); Barbara Jaensch, Dresden (DE)

(73) Assignee: Glatt Systemtechnik Dresden GmbH, Dresden (DE)

( * ) Notice: Subject to any disclaimer, the term of this patent is extended or adjusted under 35 U.S.C. 154(b) by 146 days.

(21) Appl. No.: 10/479,184

(22) PCT Filed: May 31, 2002

(86) PCT No.: PCT/DE02/02036

§ 371 (c)(1),
(2), (4) Date: Apr. 9, 2004

(87) PCT Pub. No.: WO02/098550

PCT Pub. Date: Dec. 12, 2002

(65) Prior Publication Data

US 2004/0159007 A1     Aug. 19, 2004

(30) Foreign Application Priority Data

Jun. 1, 2001   (DE) ................................ 101 26 783

(51) Int. Cl.
*F26B 17/00* (2006.01)
(52) U.S. Cl. .................... 34/593; 34/594; 34/181; 34/188; 366/170.4; 203/41
(58) Field of Classification Search ............... 34/593, 34/594, 181, 188, 241; 366/170.4; 203/39
See application file for complete search history.

(56) References Cited

U.S. PATENT DOCUMENTS

| | | | | |
|---|---|---|---|---|
| 2,597,441 A | * | 5/1952 | Borrow .................... | 34/593 |
| 2,831,418 A | * | 4/1958 | Ponisch ................... | 99/516 |
| 4,445,281 A | * | 5/1984 | Aigoo ..................... | 34/58 |
| 4,511,093 A | | 4/1985 | Ohkoshi et al. | |
| 4,527,902 A | * | 7/1985 | Christen ................ | 366/170.4 |
| 5,018,673 A | * | 5/1991 | Eirich et al. ............ | 241/62 |
| 5,321,898 A | * | 6/1994 | Robinette et al. ....... | 34/58 |
| 6,644,847 B1 | * | 11/2003 | Boos ..................... | 366/138 |

FOREIGN PATENT DOCUMENTS

| | | |
|---|---|---|
| DE | 3633027 | 6/1988 |
| EP | 0385956 | 9/1990 |
| EP | 0609498 | 8/1994 |
| JP | 5049901 | 3/1993 |
| JP | 2000354753 | 12/2000 |

* cited by examiner

Primary Examiner—S. Gravini
(74) Attorney, Agent, or Firm—Jacobson Holman PLLC

(57) ABSTRACT

The invention relates to a device for feeding a drying gas to a mixing granulator comprising a mixing chamber and a rotating agitator (3), on which mixer blades (4) are arranged in a radial position with respect to a drive shaft (5). The feeder line (6) for the drying gas is disposed inside the drive shaft (5) of the agitator (3). An exit line (7) is respectively connected in the region of each mixer blade (4), said line terminating in at least one outlet (8) arranged underneath and, in the direction of rotation, behind the mixer blades (s). The outlet (8) extends advantageously in at least partial manner along the mixer blades (4), embodied in the form of a slit or in a flat manner in the form of a porous element.

7 Claims, 1 Drawing Sheet

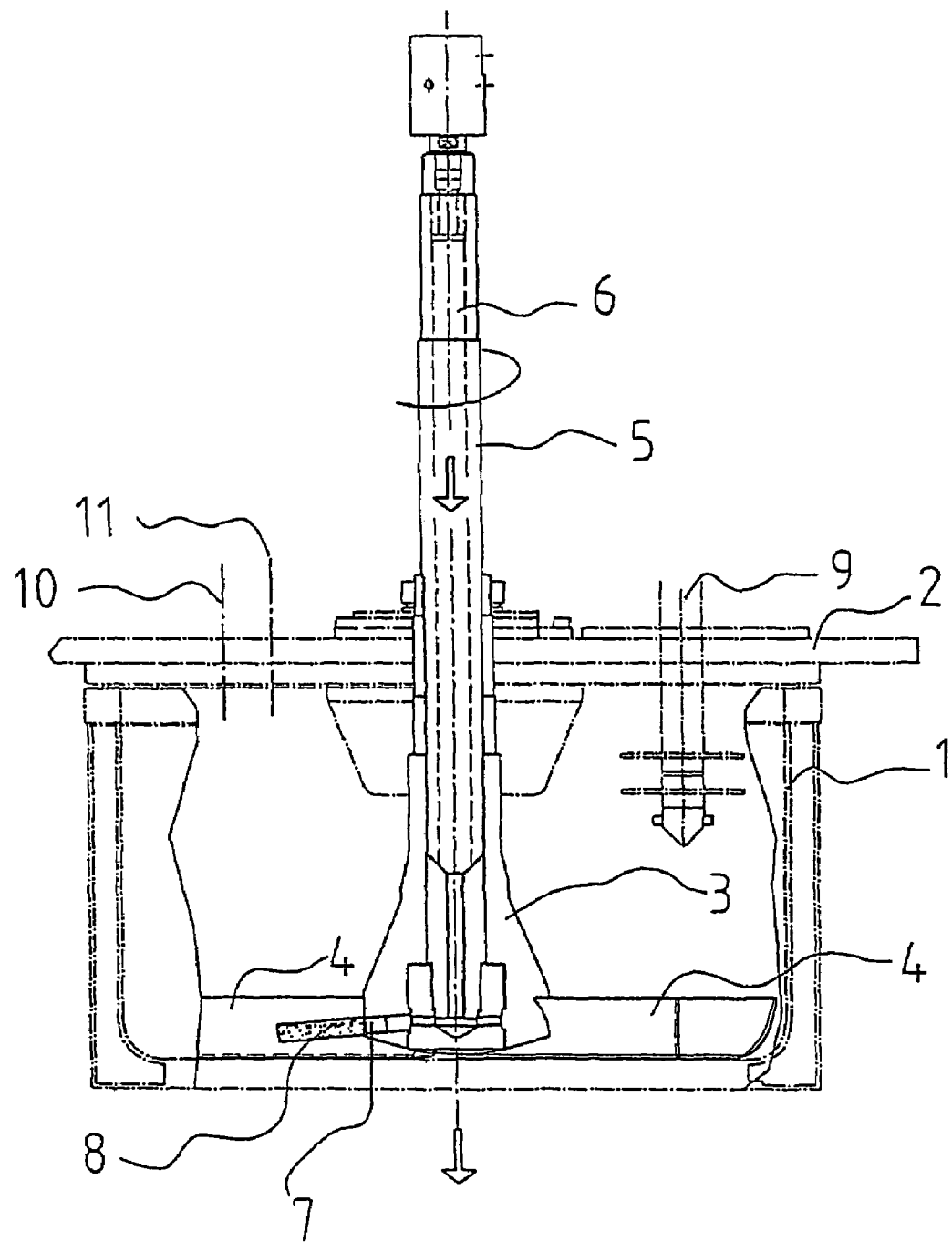

DEVICE FOR FEEDING A DRYING GAS TO A MIXING GRANULATOR

This is a nationalization of PCT/DE02/02036 filed May 31, 2002 and published in German.

The invention relates to a device for feeding a drying gas to a mixing granulator with a mixing chamber and a rotating agitator, on which mixer blades are arranged in a radial position with respect to a drive shaft.

In a mixing granulator such as this, a powder and a liquid binding agent are added to and mixed in the mixing chamber while the agitator rotates. The result is a dough-like mass as the mixed product, which is immediately crushed into granulate-like particles by means of a mechanically operating crusher. As a result, the granulate-like particles are dried to granulate that can be handled by the agitator by means of a drying gas during the agitation. Modern mixing granulators operate at high efficiencies, whereby an adequately high amount of drying gas must be fed into, and discharged back out of the mixing chamber in the time unit.

According to prior art, several different solutions are known of feeding drying gas into the mixing chamber. Among others, EP 385 956 B1 provides a device for the production of bulk material in the shape of balls of small diameters, made of a finely pulverized material. Ground blades rotate around a vertical axis in a boiler, and means for the supply and extraction of gas, or of a gas mixture, are present. For feeding the gas, a ring-shaped porous wall is provided at the bottom of the boiler, which is arranged in a radial position in the area of a porous lower surface of the ground blades. The drying gas entering in a flat manner through the bottom of the mixing chamber is therefore directed underneath the ground blades.

A mixing granulator is described in JP 50 49 901 A, in which an agitator with a vertical axis, as well as mixer blades are arranged at the bottom of the mixing granulator. The central part of the agitator is embodied like a bell, whereby the mixer blades essentially are attached at the bottom. Via a gas feeder line, drying gas can be fed into the upper area of the bell-shaped rotor component, and flows toward the bottom along the interior wall, until it enters the chamber of the mixing granulator in the area of the mixer blades.

The invention is based on the task of providing a device for feeding a drying gas to a mixing granulator of the above described type, which enables the effective feeding of a larger amount of a drying gas.

The invention performs the task by means of the characteristics stated in the representative part of claim 1. Advantageous further embodiments of the invention are characterized in the sub-claims, and, together with the description of the preferred embodiment of the invention, including the drawing, are explained in detail as follows.

The invention essentially consists of the fact that the drying gas is fed across the axis of the agitator, and that each of the mixer blades has an exit line, which has at least one outlet arranged underneath and in the direction of the rotation, behind the mixer blades.

By integrating the feeder line into the rotor axis, the feeding of the drying gas occurs at a minimal requirement of space and without any separate gas lines. The outlet of the drying gas occurs into the space that is essentially free of granulate, as the same is tossed toward the top at the front surfaces of the mixer blades. The drying gas thereby flows in a wide area through the granulate, which is again falling to the bottom due to the dispersion, and can thereby discharge moisture from the granulate in a markedly effective manner. The solution according to the invention thereby also particularly enables the effective feeding of very large amounts of drying gas.

The practical embodiment of the outlet is possible in different ways, for example in accordance with claims 2 to 4. Accordingly, the outlets extend at least partially along the length of the mixer blades. This can be embodied in the form of simple slits, or in the form of porous elements. The goal of the individual solutions is to create plane outlets. In so far as separate outlets are used, it is beneficial to connect the respective elements to the exit line via quick-release fasteners that are known as such.

Generally, the invention is not restricted to a particular position of the axis, or suspension of the agitator. However, it has been proven advantageous to arrange the axis of the agitator vertical to a mixing granulator with a static cover and a mixing chamber that can be lowered vertically. In such a mixing granulator, all other elements, such as the feeder lines for the base materials of the granulate to be produced, the required crusher, and the suction line for the drying gas can also be arranged on the static cover. The mixing chamber that can be lowered vertically is then completely free of technically required assembly components, and can, for example, advantageously be emptied and cleaned.

The special advantage of the invention is that a large amount of drying gas can be fed across the axis of the agitator without any separate feeder lines, and introduced in a plane manner underneath the agitating granulate into the mixing chamber by means of the outlets according to the invention.

The invention is further explained in detail by means of an embodiment example, as follows.

The drawing shows a partial section across a mixing granulator with a device for feeding a drying gas according to the invention.

The mixing granulator consists of a housing 1, a cover 2, and an agitator 3 supported in the cover 2. The housing 1 is embodied with two walls, and the temperature can be maintained by means of a fluid. The cover 2 is statically arranged within a rack that is not illustrated, and the housing 1 can be lowered vertically toward the bottom.

In the operating position illustrated, the agitator 3 is lowered into the housing 1, and only a minimal gap necessary for construction design purposes exists on the bottom of the housing 1 between both elements.

The agitator 3 essentially consists of a drive shaft 5, and three radial mixer blades 4 arranged on it. The rotary drive of the agitator 3 is located above the cover 2, and is not illustrated in the drawing.

For the feeding of the drying gas into the mixing chamber, a feeder line 6 is embodied in the drive shaft 5 of the agitator 3. The feeder line 6 terminates at the bottom in the drive shaft 5, and, in the area of the mixer blades 4, is divided into one exit line 7 assigned to each of the mixer blades 4. The exit lines 7 terminate at the outlets 8, which are located in the direction of rotation of the drive shaft 5 behind the mixer blades 4. In the embodiment example, the outlets 8 are embodied in the shape of cartridges from a porous sintered body. The cartridges are screwed into the exit line 7. The attachment can also be realized by means of quick-release fasteners, such as bayonet catches.

The technologically additionally required elements for a mixing granulator are exclusively arranged on the cover 2 in the embodiment example. They include the merely principally indicated elements crusher 9, feeder devices 10 for the base materials, and a gas discharge line 11.

During the operation of the device according to the invention, a drying gas is fed via the feeder line 6. The gas flow is divided at the lower end of the drive shaft 5 into three individual flows within the exit lines 7, and enters in a wide area into the mixing chamber via the three cartridges embodied as the outlets 8. The entry into the mixing chamber occurs in the direction of rotation behind and below the mixer blades 4 in tunnel-shaped chambers within the rotating granulate. From there, the drying gas flows in a wide area through the rotating granulate, absorbs moisture from the granulate at a great efficiency rate, and discharges it from the mixing chamber via the gas discharge line 11.

Of course, the invention is not limited to the embodiment example described. It is possible without any problems to embody the agitator differently, for example with other mixer blades; to arrange the axis of the drive shaft in a different position, or to change the outlet. Several feeder lines may also be embodied in the axis of the agitator. This invention also includes any solutions, in which not every one of the existing mixer blades has an outlet, such as when the said blades are present on several levels.

LIST OF REFERENCE SYMOBOLS USED
1 housing
2 cover
3 agitator
4 mixer blades
5 drive shaft
6 feeder line
7 outlet
8 exit line
9 crusher
10 feeding device
11 gas discharge line

What is claimed is:

1. Device for feeding a drying gas to a mixing granulator with a mixing chamber and a rotating agitator (3), on which mixer blades (4) are arranged in a radial position with respect to a drive shaft (5), characterized in that a feeder line (6) for the drying gas is disposed inside the drive shaft (5) of the agitator (3), to which one exit line (7) each is connected in the area of each mixer blade (4), and that each exit line (7) has at least one outlet (8) underneath and, in the direction of the rotation, behind the mixer blades (4).

2. Device according to claim 1, characterized in that the outlet (8) extends at least partially along the length of the mixer blades (4).

3. Device according to claim 2, characterized in that the outlet (8) is embodied in the form of a slit.

4. Device according to claim 2, characterized in that a porous element is present as the outlet (8), via which the drying gas can exit in a flat manner.

5. Device according to claim 1, characterized in that the outlet (8) is connected to the exit line (7) by means of a known quick-release fastener.

6. Device according to claim 1, characterized in that the mixing granulator has an upper static cover (2), and a housing (1) that can be lowered vertically, and that the agitator (3) is supported on the vertical axis in the cover (2).

7. Device according to claim 6, characterized in that, as an additional technical device, at least a crusher (9) and/or feeder lines (10) for the base material, and/or a discharge line (11) for the drying gas are provided on the cover (2).

* * * * *